United States Patent [19]

Yamamoto et al.

[11] Patent Number: 4,548,873
[45] Date of Patent: Oct. 22, 1985

[54] MAGNETIC RECORDING MEDIA WITH OXYFATTY ACID LUBRICANT

[75] Inventors: Nobuyuki Yamamoto; Yoshito Mukaida; Nobuo Tsuji, all of Kanagawa; Yuzo Higaki; Toshihisa Okamura, both of Tokyo, all of Japan

[73] Assignee: Fuji Photo Film Co., Ltd., Kanagawa, Japan

[21] Appl. No.: 538,725

[22] Filed: Oct. 3, 1983

[30] Foreign Application Priority Data

Oct. 1, 1982 [JP] Japan .................................. 57-170945

[51] Int. Cl.$^4$ .............................................. G11B 5/70
[52] U.S. Cl. .................................. 428/695; 252/62.54; 427/128; 427/131; 428/694; 428/900
[58] Field of Search ........................ 428/694, 695, 900; 427/131, 128; 252/62.54; 360/134–136

[56] References Cited

U.S. PATENT DOCUMENTS

| | | | |
|---|---|---|---|
| 4,349,608 | 9/1982 | Shimizu et al. | 428/695 |
| 4,361,621 | 11/1982 | Isobe et al. | 428/329 |
| 4,361,627 | 11/1982 | Ohata | 428/695 |
| 4,390,601 | 6/1983 | Ono | 428/695 |
| 4,420,540 | 12/1983 | Ogawa et al. | 428/695 |
| 4,476,195 | 10/1984 | Ono | 428/695 |

*Primary Examiner*—Ellis P. Robinson
*Attorney, Agent, or Firm*—Sughrue, Mion, Zinn, Macpeak & Seas

[57] ABSTRACT

A magnetic recording medium is disclosed. The medium is comprised of a support and a magnetic layer provided thereon wherein an oxyfatty acid is incorporated in the magnetic layer or in the surface of a support or layer coming into contact with the magnetic layer. The coefficients of friction of the magnetic layer with parts of a magnetic recording/reproducing deck are low and thus the magnetic recording medium has superior lubricity.

16 Claims, No Drawings

MAGNETIC RECORDING MEDIA WITH OXYFATTY ACID LUBRICANT

FIELD OF THE INVENTION

The present invention relates to magnetic recording media, and more particularly, to magnetic recording media with a magnetic layer having superior surface characteristics; when the magnetic layer is passed through a magnetic recording/reproducing deck while in contact therewith, its coefficients of friction with various materials are low and its lubricity is superior.

BACKGROUND OF THE INVENTION

With magnetic recording media having insufficiently improved lubricity, the surface of a magnetic layer is smoothed by repeated contact with contacting parts of the magnetic recording/reproducing deck, resulting in an increase in the coefficient of friction of the magnetic layer. When a magnetic recording medium with a magnetic layer having such an increased coefficient of friction is passed through the magnetic recording/reproducing deck particularly under high humidity conditions (relative humidity; at least 60%), a cohesion phenomenon occurs at running-contact areas of the magnetic recording medium due to the presence of fine water droplets.

When the cohesion phenomenon occurs, if the running tension is greater than the cohesion strength, a stick-slip running is caused, producing a running noise comprising audible sound. In the recording of a magnetic recording medium which is undergoing stick-slip running, the frequency of the recording signal is modulated in the running direction and, therefore, the normal reproduction of records becomes difficult. On the other hand, when the stick-slip running occurs at the time of reproducing a magnetic recording medium which has been recorded, no normal reproduction can be conducted and wow-flutter and jitter phenomena, etc. are caused.

When cohesion is caused between the magnetic recording medium and the running-contacting parts of the magnetic recording/reproducing deck, if the cohesive strength is greater than the running tension, the running of the magnetic recording medium is stopped and reproduction becomes impossible.

The foregoing phenomena are generally called "tape squeal" in the art, and magnetic recording media and magnetic recording/reproducing decks causing such phenomena are seriously reduced in their product value.

The "tape squeal" is caused by the material of the magnetic recording medium running system in the magnetic recording/reproducing deck, the running tension, the running speed, etc. In the case of the magnetic recording medium, the smoothness of the surface, an increase in the coefficient of friction, etc. are responsible for the "tape squeal".

In order to improve the surface lubricity of magnetic recording media, a number of solid or liquid lubricants have been used, as described in U.S. Pat. Nos. 3,476,596, 3,470,021, 3,634,253, 3,630,772, 3,547,693, 3,274,111, 4,018,968, 3,387,993 and 3,492,235. Examples of such lubricants include inorganic or organic fine powders (e.g., $Al_2O_3$, graphite, silica, $Cr_2O_3$, ZnO, and carbon black) and organic surface active agents (e.g., higher hydrocarbon compounds, aliphatic alcohols, fatty acids, fatty acid esters, fatty acid amides, fatty acid salts, and fatty acid quaternary salts). With regard to the organic surface active agents, there is no limitation on the number of carbon atoms, and those compounds having a boiling point of at least about 100° C. and a melting point of about 150° C. or less are preferred. These lubricants are added in an amount ranging between 0.1 and 20 parts by weight per 100 parts by weight of the binder.

However, the addition of such additives does not always succeeds in preparing a magnetic recording layer having desirable characteristics. For example, the addition of large amounts of additives may result in a decrease in the mechanical strength of the recording layer. In some cases, there is observed the phenomenon that, after the formation of the recording layer, the additive gradually comes out to the surface of the recording layer. Furthermore, the dispersion of magnetic substances is not always satisfactory.

Fatty acid are typical examples of such lubricants (U.S. Pat. Nos. 3,470,021 and 3,634,253). When, however, these fatty acids are added in effective amounts to prevent the "tape squeal", electromagnetic properties are adversely influenced, resulting in a decrease in S/N. Other typical lubricants are fatty acid esters exemplified by butyl palmitate (U.S. Pat. No. 3,274,111). When butyl palmitate is added to the magnetic layer in effective amounts to improve the running properties on guide poles of stainless steel in the running system of a deck for magnetic materials, the "tape squeal" phenomenon occurs at the deck head portion.

SUMMARY OF THE INVENTION

The present invention is intended to overcome the above-described disadvantages.

An object of the invention is to provide novel additives for a magnetic layer.

Another object of the invention is to provide magnetic recording media with a magnetic layer having improved surface characteristics.

Still another object of the invention is to provide magnetic recording media having good sensitivity.

A further object of the invention is to provide magnetic recording media having such good storage stability such that its additives do not come out on the surface of the recording layer.

The present invention relates to a magnetic recording medium comprising a support having provided thereon a magnetic layer and an oxyfatty acid.

DETAILED DESCRIPTION OF THE INVENTION

The term "oxyfatty acid" as used herein means aliphatic monocarboxylic acid containing a hydroxyl group in the molecule thereof, preferably containing from 10 to 24 carbon atoms, more preferably from 12 to 18 carbon atoms. The melting point of the oxyfatty acid is preferably from −20° C. to 200° C. and more preferably from 0° C. to 150° C.

Some well known oxyfatty acids include monooxy saturated acids, monooxy unsaturated acids, and polyoxy saturated acids.

Monooxy saturated acids include glycolic acid, lactic acid, oxyvaleric acid, oxycaproic acid, oxycaprylic acid, oxycapric acid, oxylauric acid, oxymyristic acid, oxypalmitic acid, oxystearic acid, and oxybehenic acid.

Monooxy unsaturated acids include parasorbic acid, ambrettolic acid, and ricinoleic acid.

Polyoxy saturated acids include dioxymyristic acid, dioxypalmitic acid, dioxystearic acid, lanoceric acid, and trioxypalmitic acid.

The present invention is not limited to the above-described compounds, and any oxyfatty acids, natural or synthetic, can be used in the invention.

Commercially available preferred oxyfatty acids include lactic acid, ricinoleic acid obtained from castor oil, and 12-oxystearic acid resulting from hydrogenation of ricinoleic acid.

In the magnetic recording medium of the invention, the magnetic layer comprises a binder and ferromagnetic powder dispersed in the binder. The amount of the ferromagnetic powder used is from 50 to 2,000 parts by weight per 100 parts by weight of the binder. The amount of the oxyfatty acid being added is from 0.01 to 20 parts by weight, preferably from 0.1 to 10 parts by weight, more preferably from 0.5 to 5 parts by weight, per 100 parts by weight of the ferromagnetic powder.

In producing the magnetic recording medium of the invention, the oxyfatty acid can be added in various manners; for example, (i) the ferromagnetic powder is impregnated with the oxyfatty acid; (ii) before or after the dispersion of the ferromagnetic powder in the binder, the oxyfatty acid is added; (iii) the fatty acid is coated on the magnetic layer provided on the support; or (iv) the oxyfatty acid is incorporated in the opposite surface of the support to the magnetic layer or in the back layer thereof. When the oxyfatty acid is incorporated in the reverse side of the support or the back layer, it is transferred to the magnetic layer. Of these, it is preferred that the oxyfatty acid is added in the manner (ii) or (iii) above.

Known ferromagnetic fine powders can be used in the invention including $\gamma$-$Fe_2O_3$, Co-containing $\gamma$-$Fe_2O_3$, $Fe_3O_4$, Co-containing $Fe_3O_4$, $CrO_2$, Co-Ni-P alloy, and Co-Ni-Fe alloy. Specific examples are described in Japanese Patent Publication Nos. 14090/69, 18372/70, 22062/72, 22513/72, 28466/71, 38755/71, 4286/72, 12422/72, 17284/72, 18509/72, and 18573/72.

Useful binders include conventionally known thermoplastic resins, thermosetting or reactive resins, and their mixtures.

Thermoplastic resins which can be used are those resins having a softening point of 150° C. or lower, an average molecular weight of from 10,000 to 200,000, and degree of polymerization of about 200 to about 500, and mixtures thereof. Examples are a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinylidene chloride copolymer, an acrylic acid ester-styrene copolymer, a methacrylic acid ester-acrylonitrile copolymer, a methacrylic acid ester-vinylidene chloride copolymer, a methacrylic acid ester-styrene copolymer, a urethane elastomer, a nylon-silicone resin, a nitrocellulose-polyamide resin, polyvinyl fluoride, a vinylidene chloride-acrylonitrile copolymer, a butadiene-acrylonitrile copolymer, a polyamide resin, polyvinyl butyral, cellulose derivatives (e.g., cellulose acetate butyrate, cellulose diacetate, cellulose triacetate, cellulose propionate, and cellulose nitrate), a styrene-butadiene copolymer, a polyester resin, a chloro vinyl ether-acrylic acid ester copolymer, an amino resin and various synthetic rubbers.

Specific examples of these resins are described in, for example, Japanese Patent Publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72, and 27886/72.

Thermosetting or reactive resins have a molecular weight of 200,000 or less in the state of coating solution and, when heated after coating and drying, undergo reactions such as condensation and addition, having an infinite molecular weight. Of these resins, those resins are preferred that do not soften or melt before heat-decomposition occurs. Typical examples are a phenol resin, an epoxy resin, a polyurethane curing type resin, a urea resin, a melamine resin, an alkyl resin, a silicone resin, an acryl-based reactive resin, an epoxy-polymide resin, a cellulose nitrate-melamine resin, a mixture of a high molecular weight polyester resin and an isocyanate prepolymer, a mixture of a methacrylate copolymer and a diisocyanate prepolymer, a mixture of polyester polyol and polyisocyanate, a urea-formaldehyde resin, a mixture of low molecular weight glycol/high molecular weight diol/triphenylmethane triisocyanate, a polyamine resin, and their mixtures.

These compounds are described in Japanese Patent Publication Nos. 8103/64, 9779/65, 7192/66, 8016/66, 14275/66, 18179/67, 12081/68, 28023/69, 14501/70, 24902/70, 13103/71, 22065/72, 22056/72, 22067/72, 22072/72, 22073/72, 28045/72, 28048/72, 28922/72, etc.

These binders are used alone or in combination with each other. Other additives such as dispersants, lubricants and abrasives may be added thereto.

Various lubricants can be used in combination with the oxyfatty acid of the invention. Examples of such lubricants include carbon black of various sizes (mean grain size: 10 to 1,000 m$\mu$), silicone oil, graphite, molybdenum disulfide, tungsten disulfide, fatty acid esters derived from monobasic fatty acids containing from 12 to 16 carbon atoms and monohydric alcohols containing from 3 to 12 carbon atoms, fatty acid esters derived from monobasic fatty acids containing at least 17 carbon atoms and monohydric alcohols (wherein total number of carbon atoms in the fatty acid and alcohol being from 21 to 23) and their mixtures. These lubricants can be added in an amount of 0.2 to 20 parts per 100 parts of the binder. Specific examples of such lubricants are described in Japanese Patent Publication No. 23889/68, U.S. Pat. No. 3,423,233, and Japanese Patent Publication No. 28043/72.

Dispersants which can be used include fatty acids containing from 12 to 18 carbon atoms: $R_1COOH$ (wherein $R_1$ is an alkyl group containing from 11 to 17 carbon atoms); for example, caprylic acid, capric acid, lauric acid, myristic acid, palmitic acid, stearic acid, oleic acid, elaidic acid, linoleic acid, linolenic acid, and stearolic acid; metallic soaps comprising the alkali metal (e.g., Li, Na, and K) or alkaline earth metal (e.g., Mg, Ca, and Ba) salts of the foregoing fatty acids; and lecithin. In addition, higher alcohols containing at least 12 carbon atoms and their sulfuric acid esters, etc. can be used. The amount of the dispersant added is from 1 to 20 parts per 100 parts of the binder. Specific examples of such dispersants are described in, for example, Japanese Patent Publication Nos. 28369/64, 17945/69, 15001/73, U.S. Pat. Nos. 3,387,993, and 3,470,021.

Commonly used abrasives can be used, including fused alumina, silicon carbide, chromium oxide, corundum, synthetic corundum, diamond, synthetic diamond, garnet, and emery (main components: corundum and magnetite). The mean grain diameter of the abrasives is from 0.05 to 5 μm and preferably from 0.1 to 2 μm. The amount of the abrasive added is from 2 to 20 parts per 100 parts of the binder. Specific examples of the abrasives are described in, for example, U.S. Pat. No. 3,687,725.

Organic solvents which can be used in kneading and coating include ketones such as acetone, methyl ethyl ketone, methyl butyl ketone, and cyclohexanone; alcohols such as methanol, ethanol, propanol, and butanol; esters such as methyl acetate, ethyl acetate, butyl acetate, ethyl lactate, and glycol acetate monoethyl ether; ethers and glycol ethers such as glycol dimethyl ether, glycol monoethyl ether, and dioxane; tars (aromatic hydrocarbons) such as benzene, toluene, and xylene; and chlorinated hydrocarbons such as methylene chloride, ethylene chloride, carbon tetrachloride, chloroform, ethylenechlohydrin, and dichlorobenzene.

In preparing a magnetic layer, a desired combination of the above-described components is dissolved in an organic solvent, and the resulting coating solution is then coated on a non-magnetic support base. The thickness of the magnetic layer is generally from 0.01 to 50 μm, preferably from 0.05 to 30 μm and more preferably from 0.1 to 20 μm. Materials which can be used in preparing the non-magnetic support base include polyesters such as polyethylene terephthalate and polyethylene naphthalate; polyolefins such as polypropylene; cellulose derivatives such as cellulose triacetate and cellulose diacetate; vinyl-based resins such as polyvinyl chloride; polycarbonate; and like plastics; metals such as aluminum; and ceramics such as glass. A polyethylene terephthalate film having a thickness of 1 to 100 μm is preferably used as the support base.

The foregoing magnetic recording layer can be provided on the support base by techniques such as air doctor coating, blade coating, air knife coating, squeese coating, dip coating, reverse roll coating, transfer roll coating, gravure coating, kiss coating, cast coating, and spray coating. Other coating methods can be used. These coating techniques are described in detail in *Coating Kogaku (Coating Engineering)*, published by Asakura Shoten (Tokyo), pp. 253-277 (Mar. 20, 1971).

The magnetic layer thus coated on the support is, if necessary, subjected to a treatment to orientate the magnetic powder therein and then dried. Further, if necessary, a surface smoothening processing is applied, or the magnetic material is cut to the desired size to produce the magnetic recording medium of the invention. These procedures are described in, for example, Japanese Patent Publication Nos. 23625/65, 28368/64, and U.S. Pat. No. 3,473,960. In addition, the methods described in Japanese Patent Publication No. 13181/66 are believed to be basic and important techniques in this field.

Ferromagnetic powder, additives to be added to the magnetic layer, supports, the back layer, and methods for the production of magnetic recording media as used herein are also described in detail in Japanese Patent Publication No. 26890/81.

The present invention is explained in greater detail by reference to the following examples. However, the scope of the invention is not limited to these examples. All parts are by weight.

EXAMPLE 1

| | Amount (parts) |
| --- | --- |
| γ-Fe$_2$O$_3$ powder | 300 |
| Vinyl chloride/vinyl acetate (87/13) copolymer (degree of polymerization: about 400) | 30 |
| Epoxy resin (epoxy group content: 0.56) | 30 |
| Carbon black (mean grain size: 80 mμ) | 5 |
| Ethyl acetate | 250 |
| Cyclohexanone | 250 |
| Test compound as shown in Table 1 | Shown in Table 1 |

These ingredients were placed in a ball mill and fully kneaded and, thereafter, 35 parts of Desmodule L-75 (trade name for a polyisocyanate compound produced by Bayer Co.) was added thereto. The resulting mixture was uniformly dispersed to prepare a magnetic coating composition.

This magnetic coating composition was coated on a polyester film and dried to produce a magnetic tape having a 5 μm thick magnetic layer.

The dynamic coefficient of friction of the magnetic tape was measured at 25° C. and 83% RH, and the results are shown in Table 1 below.

TABLE 1

| Run No. | Test Compound | Amount (parts) | Dynamic Coefficient of Friction |
| --- | --- | --- | --- |
| *1 | None | — | 1.26 |
| 2 | 12-Oxystearic acid | 1.5 | 1.10 |
| 3 | " | 10 | 1.00 |
| 4 | " | 30 | 1.15 |
| 5 | Ricinoleic acid | 1.5 | 1.09 |
| 6 | " | 10 | 1.08 |
| 7 | " | 30 | 1.13 |
| 8 | Lactic acid | 1.5 | 1.12 |
| 9 | " | 10 | 1.11 |
| 10 | " | 30 | 1.14 |
| 11 | Dioxypalmitic acid | 1.5 | 1.08 |
| 12 | " | 10 | 1.07 |
| 13 | " | 30 | 1.14 |

*Comparative sample

The dynamic coefficient of friction was measured as follows:

A magnetic tape was wound on a fixed SUS pole at an angle of 180° and run at a speed of 3.3 cm/second. The dynamic coefficient of friction was calculated by the following equation:

$$\mu = \frac{1}{\pi} \ln \frac{T_2}{T_1}$$

where
$T_1$: Tension of SUS pole at the feed side;
$T_2$: Tension of SUS pole at the withdrawal side; and
$\pi$: Angle at which the tape is wound.

From the results of Table 1, it can be seen that the lubricants of the invention produce an effect of greatly lowering the dynamic coefficient of friction.

EXAMPLE 2

| | Amount (parts) |
| --- | --- |
| γ-Fe$_2$O$_3$ | 300 |

-continued

| | Amount (parts) |
|---|---|
| Vinyl chloride/vinyl acetate/vinyl alcohol (90/3/7) copolymer | 30 |
| Epoxy resin | 30 |
| Carbon black (mean grain size: 20 mμ) | 11 |
| Lecithin | 2 |
| Graphite | 2 |
| Butyl stearate | 3 |
| Test Compound | Shown in Table 2 |

These ingredients were placed in a ball mill and fully kneaded and, thereafter, 20 parts of Desmodule L-75 was added thereto. The resulting mixture was uniformly dispersed to prepare a magnetic coating composition.

This magnetic coating composition was coated on the surface of a polyester film and dried to produce a magnetic tape having a 5 μm thick magnetic layer.

The running property, RF output and surface properties of the magnetic tape were measured and the results are shown in Table 2 below.

TABLE 2

| Run No. | Compound | Amount (parts) | Number of Runnings | RF Output | Surface Properties |
|---|---|---|---|---|---|
| *14 | None | — | 16 | 0 dB | A |
| 15 | 12-Oxystearic acid | 1 | 60 or more | +0.3 | A |
| 16 | 12-Oxystearic acid | 10 | " | +0.2 | A |
| 17 | Ricinoleic acid | 1 | 53 | +0.6 | A |
| 18 | Ricinoleic acid | 10 | 48 | +0.5 | A |
| 19 | Lactic acid | 1 | 47 | +0.4 | A |
| 20 | " | 10 | 45 | +0.4 | A |
| 21 | Dioxypalmitic acid | 1 | 60 or more | +0.2 | A |
| 22 | Dioxypalmitic acid | 10 | 55 | −0.1 | A |
| *23 | Stearic acid | 1 | 19 | +0.4 | A |
| *24 | " | 10 | 14 | −2.9 | B |
| *25 | Lauric acid | 1 | 19 | +1.2 | A |
| *26 | " | 10 | 10 | +1.4 | A |

*Comparative sample

Methods of measuring the number of running, the RF output, and the surface properties and criteria therefor are as follows:

Number of Runnings

A test tape was mounted on a tape deck and repeatedly run under the conditions of 30° C. and 80% RH. The number of runnings until tape squeal occurred was measured twice, and the average value of two measurements was indicated.

RH Output

With regard to the RF output, an output when 4 MHz was recorded and reproduced was indicated in relative dB.

Surface properties

The surface properties were determined with a microscope and the eye. A test tape, when no contaminants were observed on the magnetic surface thereof, was given the symbol (A) and when some contaminants were observed, the symbol (B) was given.

Run Nos. 23 to 26 were comparative samples in which conventionally known compounds were each used. In these comparative samples, the number of runnings and the S/N surface properties were not satisfactory. Run Nos. 15 to 22 were carried out according to the present invention. From the results of Run Nos. 15 to 22, it can be seen that the addition of the lubricants of the invention is satisfactory with respect to all the tape characteristics.

Although $\gamma$-$Fe_2O_3$ was used as a magnetic substance in the foregoing examples, oxides such as $Fe_3O_4$, Co-containing $Fe_2O_3$, and $CrO_2$, alloy powders of, e.g., Fe, Fe-Co, and Fe-Co-Ni, etc. provided the same results as above.

While the invention has been described in detail and with reference to specific embodiment thereof, it will be apparent to one skilled in the art that various changes and modifications can be made therein without departing from the spirit and scope thereof.

What is claimed is:

1. A magnetic recording medium, comprising:
    a support base having provided thereon a magnetic layer having a low coefficient of friction and improved lubricity; and
    12-oxystearic acid contained within the magnetic layer.

2. A magnetic recording medium as claimed in claim 1, wherein the magnetic layer is comprised of a ferromagnetic powder dispersed in a binder wherein the ferromagnetic powder is present in an amount of from 50 to 2,000 parts by weight per 100 parts by weight of the binder.

3. A magnetic recording medium as claimed in claim 2, wherein the 12-oxystearic acid is present in an amount in the range of 0.01 to 20 parts by weight per 100 parts by weight of the ferromagnetic powder.

4. A magnetic recording medium as claimed in claim 3, wherein the 12-oxystearic acid is present in an amount in the range of from 0.1 to 10 parts by weight per 100 parts by weight of the ferromagnetic powder.

5. A magnetic recording medium as claimed in claim 4, wherein the 12-oxystearic acid is present in an amount in the range of from 0.5 to 5 parts by weight per 100 parts by weight of the ferromagnetic powder.

6. A magnetic recording medium as claimed in claim 1, wherein the magnetic layer comprises a binder containing a dispersion of the ferromagnetic powder, and before the dispersion of the ferromagnetic powder in the binder, the 12-oxystearic acid is added.

7. A magnetic recording medium as claimed in claim 1, wherein the magnetic layer comprises a binder and after the dispersion of the ferromagnetic powder in the binder, the 12-oxystearic acid is added.

8. A magnetic recording medium as claimed in claim 1, wherein the magnetic layer is formed by forming a dispersion of the ferromagnetic powder, a binder and the 12-oxystearic acid in a solvent, whereafter the same is coated on the support base and dried to yield the magnetic layer.

9. A magnetic recording medium, comprising:
    a support base having provided thereon a magnetic layer having a low coefficient of friction and improved lubricity; and
    dioxypalmitic acid contained within the magnetic layer.

10. A magnetic recording medium as claimed in claim 9, wherein the magnetic layer is comprised of a ferromagnetic powder dispersed in a binder wherein the ferromagnetic powder is present in an amount of from 50 to 2,000 parts by weight per 100 parts by weight of the binder.

11. A magnetic recording medium as claimed in claim 10, wherein the dioxypalmitic acid is present in an amount in the range of 0.01 to 20 parts by weight per 100 parts by weight of the ferromagnetic powder.

12. A magnetic recording medium as claimed in claim 11, wherein the dioxypalmitic acid is present in an amount in the range of form 0.1 to 10 parts by weight per 100 parts by weight of the ferromagnetic powder.

13. A magnetic recording medium as claimed in claim 12, wherein the dioxypalmitic acid is present in an amount in the range of from 0.5 to 5 parts by weight per 100 parts by weight of the ferromagnetic powder.

14. A magnetic recording medium as claimed in claim 9, wherein the magnetic layer comprises a binder containing a dispersion of the ferromagnetic powder, and before the dispersion of the ferromagnetic powder in the binder, the dioxypalmitic acid is added.

15. A magnetic recording medium as claimed in claim 9, wherein the magnetic layer comprises a binder and after the dispersion of the ferromagnetic powder in the binder, the dioxypalmitic acid is added.

16. A magnetic recording medium as claimed in claim 9, wherein the magnetic layer is formed by forming a dispersion of the ferromagnetic powder, a binder and the dioxypalmitic acid in a solvent, whereafter the same is coated on the support base and dried to yield the magnetic layer.

* * * * *